(12) United States Patent
Guerin

(10) Patent No.: US 9,335,830 B2
(45) Date of Patent: May 10, 2016

(54) KEYBOARD WITH MACRO KEYS MADE UP OF POSITIONALLY ADJUSTABLE MICRO KEYS

(71) Applicant: International Business Machines Corporation, Armonk, NY (US)

(72) Inventor: Xavier R. Guerin, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 388 days.

(21) Appl. No.: 13/927,222

(22) Filed: Jun. 26, 2013

(65) Prior Publication Data

US 2015/0002992 A1 Jan. 1, 2015

(51) Int. Cl.
*G06F 3/02* (2006.01)
*H01H 13/705* (2006.01)
*G06F 3/023* (2006.01)
*H01H 3/02* (2006.01)

(52) U.S. Cl.
CPC ............ *G06F 3/0216* (2013.01); *G06F 3/0202* (2013.01); *G06F 3/0238* (2013.01); *H01H 13/705* (2013.01); *H01H 2003/0266* (2013.01); *H01H 2217/036* (2013.01); *H01H 2221/04* (2013.01); *H01H 2223/0345* (2013.01)

(58) Field of Classification Search
CPC ... G06F 3/0216; G06F 3/0233; G06F 3/0235; G06F 3/30238; H01H 13/84; H01H 2217/036; H01H 2223/0345
See application file for complete search history.

(56) References Cited

U.S. PATENT DOCUMENTS

| | | | |
|---|---|---|---|
| 3,831,730 A | 8/1974 | Koeppe | |
| 4,597,681 A | 7/1986 | Hodges | |
| 5,717,423 A * | 2/1998 | Parker | G06F 3/016 345/108 |
| 6,543,947 B2 | 4/2003 | Lee | |
| 6,752,551 B1 | 6/2004 | Hagerman | |
| 7,385,530 B2 | 6/2008 | Griffin et al. | |
| 8,314,721 B2 | 11/2012 | Xu et al. | |
| 8,766,922 B2 * | 7/2014 | Kim | G06F 3/016 345/168 |
| 8,836,643 B2 * | 9/2014 | Romera Joliff | G06F 3/016 345/168 |
| 2006/0046031 A1 * | 3/2006 | Janevski | G06F 3/016 428/195.1 |
| 2006/0132446 A1 * | 6/2006 | Soh | G06F 3/0202 345/168 |
| 2006/0238510 A1 * | 10/2006 | Panotopoulos | G06F 3/0238 345/168 |
| 2009/0250267 A1 * | 10/2009 | Heubel | G06F 3/041 178/18.03 |
| 2010/0162109 A1 * | 6/2010 | Chatterjee | G06F 3/016 715/702 |
| 2011/0227762 A1 | 9/2011 | Bowen | |
| 2011/0234502 A1 * | 9/2011 | Yun | G06F 3/016 345/173 |
| 2012/0127000 A1 | 5/2012 | Yassa | |
| 2012/0313857 A1 * | 12/2012 | Senanayake | G06F 3/016 345/168 |

OTHER PUBLICATIONS

Tactus Technology, "Taking Touch Screen Interfaces Into a New Dimension", A Tactus Technology White Paper, pp. 1-13, Copyright 2012 Tactus Technology, Inc.

* cited by examiner

*Primary Examiner* — Daniel J Colilla
(74) *Attorney, Agent, or Firm* — David B. Woycechowsky

(57) ABSTRACT

An adjustable keyboard where a macro key is (or can be) made up of multiple, proximate micro keys by adjusting a vertical, at-rest position of the micro keys individually. More specifically, the micro keys forming the macro key are set in a high position, while micro keys surrounding the micro keys forming the macro key will generally be set in the low position. In this way, traditional data entry keyboard keys (that is, macro keys) can be built up in an arbitrary fashion, according to the desires and needs of the user, from a larger matrix of micro keys.

11 Claims, 7 Drawing Sheets

KEYBOARD WITH MACRO KEYS MADE UP OF POSITIONALLY ADJUSTABLE MICRO KEYS

FIELD OF THE INVENTION

The present invention relates generally to the field of keyboards for data entry, and more particularly to keyboards for data processing devices (herein, sometimes generically referred to as "computers").

BACKGROUND OF THE INVENTION

Keyboards for data entry are known. More specifically, keyboards for communicating alphanumeric data, and other forms of user input, to computers is known. In this document, "keyboard" shall not be understood to include touch screen keyboards, membrane keyboards or the like. Although those technologies have their place, they are not considered to be equivalent to proper keyboards with keys that a user can physically press down a substantial distance and feel move under her fingertips. Typing on a "keyboard," one that includes the feature of keys that can be pressed down is widely considered to be a more pleasant and reliable way for a user to enter alphanumeric data, and this sort of keyboard that will herein simply be referred to as a "keyboard." As a further note on background terminology, the direction of movement will be referred to as "vertical" movement and/or "up" and "down" movement, even though: (i) keyboards are not always oriented in a direction normal to the gravitational field; and (ii) some keys actually travel in an arcuate, rather than linear, path when they are pressed by a user. Instead, for purposes of this document, "vertical," "up," "down," "higher," "lower," and the like will refer to the axis of motion of a key.

It is also known to place a small dynamic display device on the top of a key of a keyboard so that when the meaning of the key is changed (for example, a dollar sign key is changed to a yuan symbol key), then the display on the key can be adjusted by an electronic signal to reflect the current meaning of the key on an on-going basis.

SUMMARY

According to an embodiment of the present invention, a keyboard assembly includes a frame, and multiple discrete key sub-assemblies. The frame and the plurality of key sub-assemblies define an up direction and a down direction. The plurality of key sub-assemblies are each mechanically connected (see definition, below) to the frame. Each key sub-assembly includes an upwards-facing surface and an elevation control sub-sub-assembly. Each elevation control sub-sub-assembly is structured, located and connected so that: (i) an at-rest position of the key sub-assembly can be adjusted between at least a high at-rest position and a low at-rest position, (ii) the upwards-facing surface is free to move in the down direction at least when the key is in the high at-rest position, and (iii) the upwards-facing surface is mechanically biased in the up direction at least when the key is in the high at-rest position. In the high at-rest position, the upwards-facing surface of the key sub-assembly will be higher than when the key sub-assembly is in its low at-rest position.

According to a further aspect of the present invention, a computer program product includes software stored on a software storage device. The software includes first program instructions programmed to send a set of output signals, and second program instructions programmed to receive a set of input signals. Each output signal of the set of output signals respectively controls an at-rest position of a discrete, upwardly-biased key on a keyboard. Each input signal of the set of input signals respectively corresponds to a vertical position of a key on the keyboard.

According to a further aspect of the present invention, a keyboard assembly includes a frame, a plurality of key members, a plurality of key output signal generators, and a plurality of elevation control systems. The frame and the plurality of key members define an up direction and a down direction. Each key member is mechanically connected to the frame respectively through one of the elevation systems of the plurality of elevation systems. Each key member includes an upwards-facing surface. Each elevation control sub-sub-assembly is structured, located and connected so that: (i) an at-rest position of the key sub-assembly can be adjusted between at least a high at-rest position and a low at-rest position, (ii) the upwards-facing surface is free to move in the down direction at least when the key is in the high at-rest position, and (iii) the upwards-facing surface is mechanically biased in the up direction at least when the key is in the high at-rest position. The plurality of key members are respectively associated with the plurality of key output signal generators. Each key output generator is structured to output a signal based upon whether its associated key member is being depressed by a user, with the signal being caused by at least one of the following mechanisms: (i) an electrical switch opens and closes based upon position of the key member, (ii) an optical switch opens and closes based upon position of the key member, and (iii) a magnetic field is changed based upon position of the key member.

DETAILED DESCRIPTION

Figure 1:
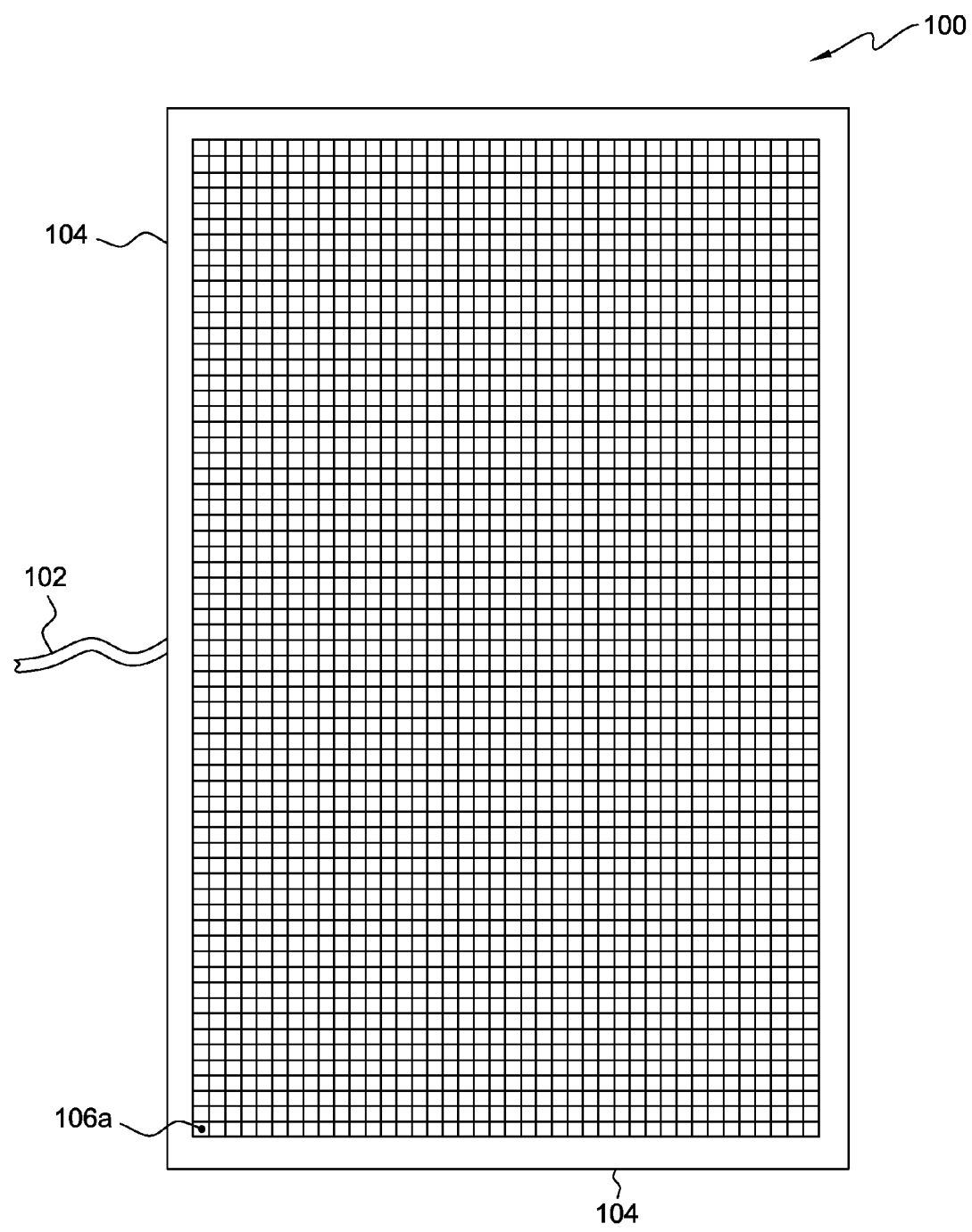
FIG. 1 is an orthographic top view of a first embodiment of an adjustable keyboard according to the present invention.

At least some embodiments of the present invention challenge a dominant paradigm in keyboard design, which is that keys of a keyboard (see discussion of "keyboard" in the BACKGROUND section, above) are permanently and conclusively determined at the time of manufacture of the keyboard assembly. While the number, size, shape, relative orientation (also called layout) and/or meaning of areas on a touchscreen used for data entry is recognized to be easily changeable, by software, even after the touchscreen device has been manufactured, this sort of adjustability of the physical layout of the keys does not apply to keyboards. It is true that the meaning of a key of a keyboard can be changed by techniques now conventional, but the size, shape and/or layout is fixed and permanent. The present invention recognizes that this can be a problem for: (i) a user who has a keyboard with a layout, key size and/or key shape which is sub-optimal for her; and (ii) a user who cannot find any mass-produced keyboard with a layout, key size and/or key shape which is optimal for her.

In light of the recognition of these problems, some embodiments of the present invention provide a new keyboard design paradigm where the user-movable keys (herein referred to as "macro keys") are each made up of multiple "micro keys," which micro keys can be moved up and down by the user (more or less) in unison. The matrix (see DEFINITIONS, below) of micro keys of the keyboard can be configured (and, at least in some embodiments, re-configured) to potentially make a great multitude of possible macro key layouts, macro key sizes and/or macro key shapes. In some embodiments, this configuration may only be done when the keyboard is assembled. In other embodiments, the configuration may be performed by consumers using keyboard control software that positionally adjusts the at-rest positions of micro key matrix, on a micro key by micro key basis, in order to form a desired macro key layout having desired macro key sizes and macro key shapes.

FIGS. 1 to 4 show an adjustable keyboard assembly (or, simply, "keyboard") 100, including: power and communication cord 102; casing 104; micro key sub-assemblies (also called morphel or micro key) 106a, b, c, d (each having micro key width of D1); macro key formation 110; and computer control system 140. Each micro key 106 includes: upper sub-sub-assembly 120; lower sub-sub-assembly and magnetic force field 160. Each upper sub-sub-assembly 120 includes dynamic display panel 150; magnetic coating layer 152; and upper frame 154. Each lower sub-sub-assembly 122 includes: elevation monitor member 170; electromagnets 172; and lower frame 174. Computer control system 140 includes processor set 142; data storage device 144; and software 146. In this embodiment, device 144: (i) stores data in a manner less transient than a signal in transit; and (ii) stores data on a tangible medium.

Adjustable keyboard 100 introduces the concept of a keyboard where macro keys are made from positionally adjustable micro keys. In embodiment 100, the micro keys are adjusted under the control of signals (for example, electronic signals, fiber optic signals) sent out under control of software 146 running on hardware 142, so the positional adjustments used to make macro key formations can be picturesquely described as "morphing" from one form to another as the control software changes from one macro key layout to another, quickly and precisely. In this sense, keyboard 100 is a polymorphic device. As will be discussed below, micro keys 101 are grouped and organized together to present an arbitrary physical input layout to a user.

Figure 2:
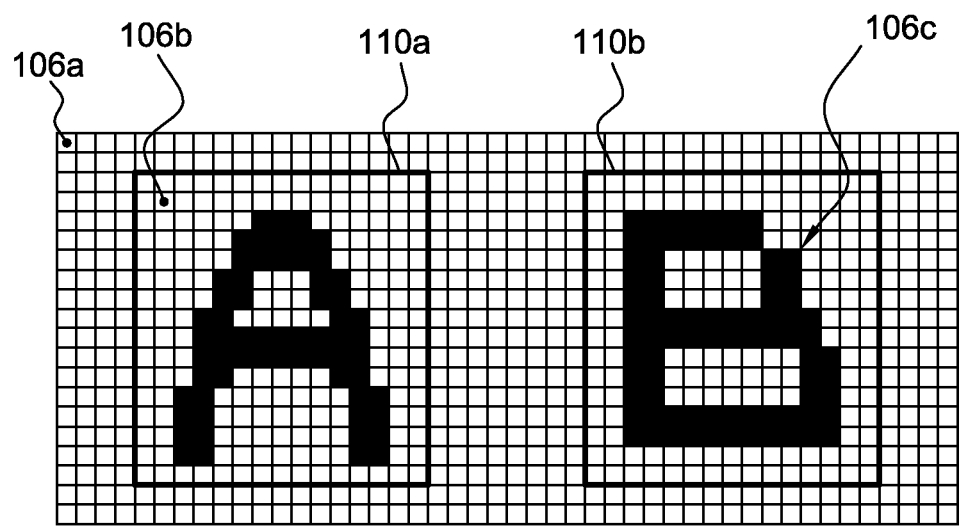
FIG. 2 is a view of a portion of the first embodiment keyboard that includes two macro keys respectively made up of multiple micro keys.
Figure 3:
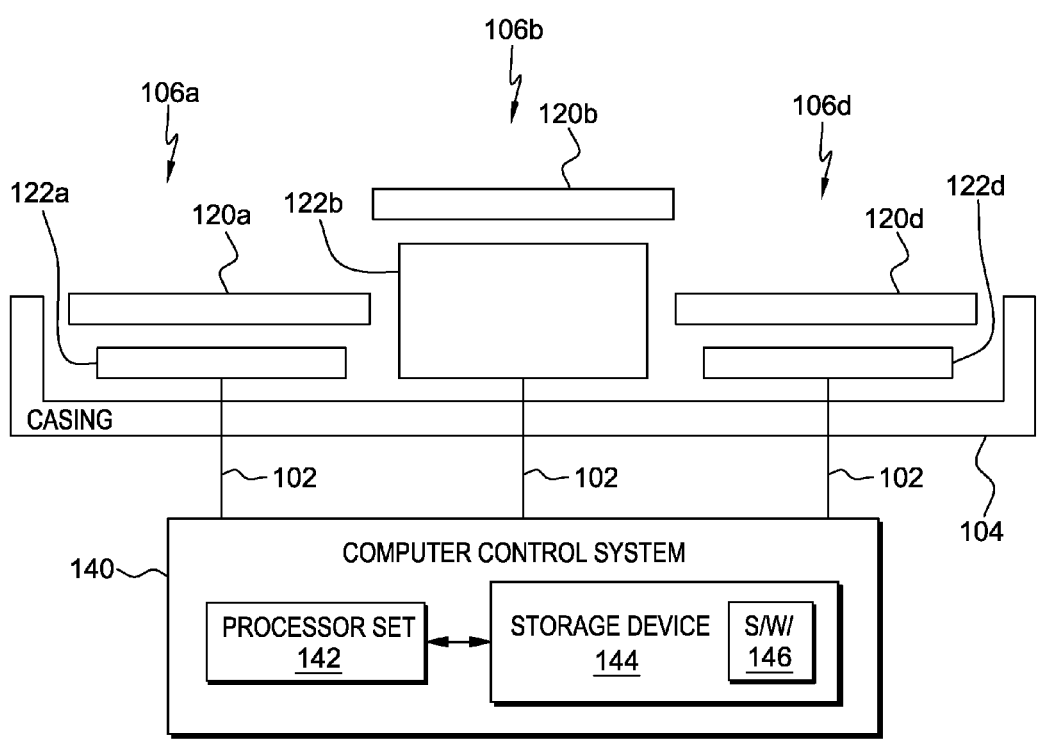
FIG. 3 is a schematic view of a portion of the first embodiment keyboard.

The micro keys are located and oriented in an array (see FIG. 1), forming an effective user interface surface of a polymorphic user input system. Each micro key has at least two possible at-rest positions (that is, positions occupied when no user is touching the micro key): (i) high position; and (ii) low position. FIG. 3 shows the high and low positions as viewed from the front side of the keyboard, with: (i) micro keys 106a and 106d being in the low position; and (ii) micro key 106b being in the high position. FIG. 2 shows how adjacent clusters of micro keys (such as micro key 106b and 106c) can be set to high position in order to make macro key formations 110a and 110b.

Figure 4:
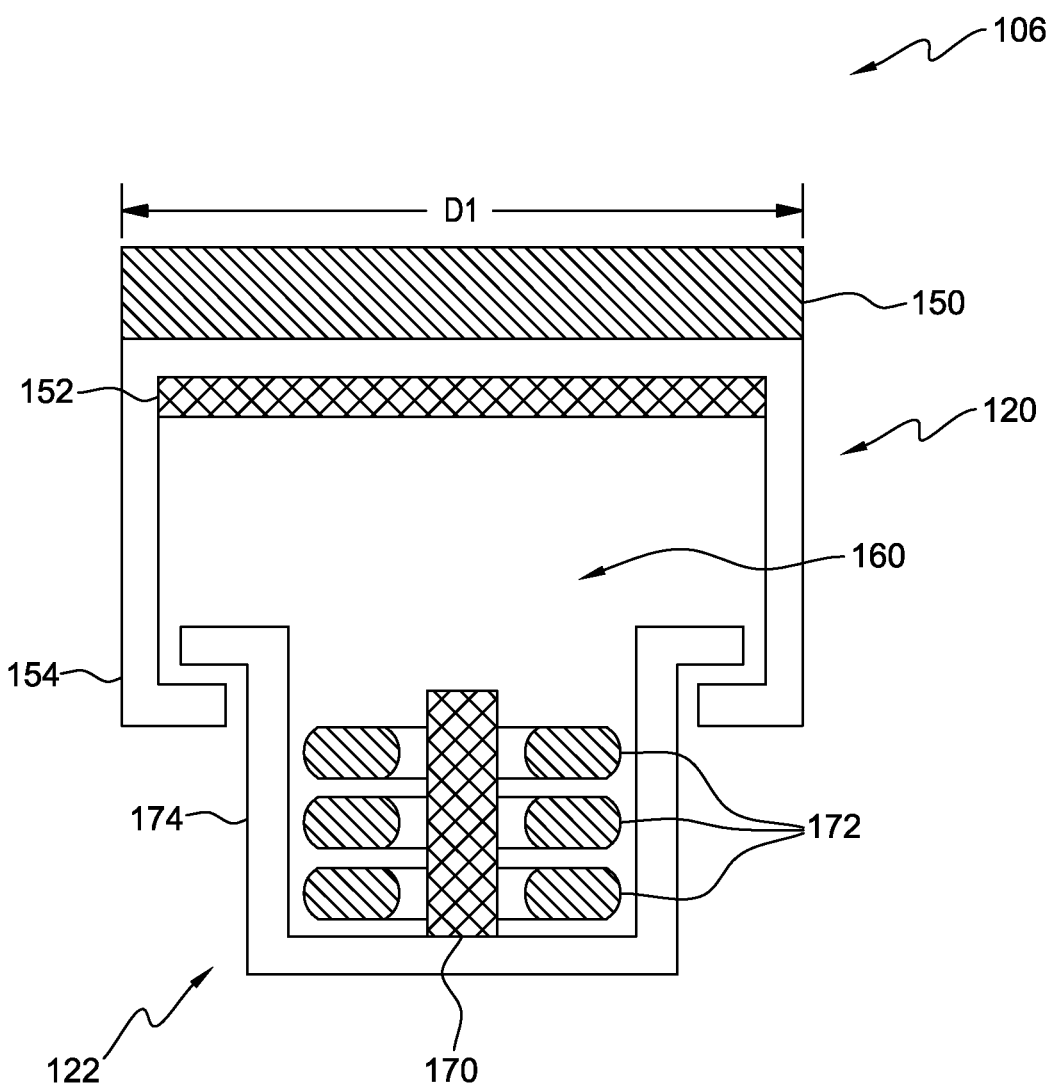
FIG. 4 is a cross sectional view of a portion of the embodiment keyboard.

In keyboard 100, the high at-rest position is achieved and ensured by an elevation co-ordination system formed in lower sub-assembly 122 of each micro key. More specifically, electromagnets 172 of each micro key are independently controlled to selectively generate magnetic field 160. At the appropriate strength and polarity, magnetic field 160 influences magnetic coating layer 152 of upper sub-assembly 122 in order to maintain the upper sub-assembly for that particular micro key in the high position. As shown in FIG. 4, the shapes of upper frame 154 and lower frame 174 prevent the upper and lower halves from disengaging from each other under the influence of the magnetic field. Alternatively, some embodiments may have more than two at-rest positions, which is to say that the elevated state can be of a finer grain. Alternatively, there are other ways, besides magnetic force and electromagnets, to adjust the positionally adjustable micro keys, such as pneumatic, quantum suspension, electromagnetic, etc.

The system used to determine the at-rest position (high or low) of the respective micro keys will sometimes be herein referred to as an elevation control system. In embodiment 100, the switchable electromagnet and its interactions with magnetic coating layer 152 form the primary portions of the elevation control system. When the electromagnet is off (that is, no current) then the top portion of the key will tend to descend, under the influence of gravity and/or magnetic interactions between coating 152 and monitor 170, to its low at-rest position. As shown in FIG. 3, the high position of a micro key can be read by computer control system 140 through communication lines 102.

In an example, using keyboard 100, the layout imposed to the polymorphic input system is a standard 105-macro-key keyboard layout. Micro keys respectively corresponding to each of the 105 macro keys are: (i) identified by calculations made through a mask; and (ii) put into the high at-rest position by controlling the respective electromagnets in the respective micro keys. Micro keys of the matrix that are not used to form macro keys will be set at a low at-rest position, which may be accomplished by: (i) turning off electromagnets so that the upper sub-assemblies 120 fall to the low position under the influence of gravity; or (ii) are held in the low position by causing the electromagnets to have a polarity such that the upper assemblies are pulled downward and actively held in their respective low positions.

In this embodiment, if it is detected that a user is pressing even one micro key that is part of a larger macro key formation, then the signal to the electromagnets of all the micro keys of that macro key will be adjusted so that the micro keys of the micro key formation move downward in unison, registering a keystroke. This simulates the cohesion of a traditional unitary macro key. Alternatively, the micro keys may be allowed to rise and fall independently of each other, with a keystroke being registered when some threshold number of micro keys are pushed downward by at least some threshold amount.

Elevation monitor member 170 generates an output signal corresponding to a vertical position of its associated micro key (in this embodiment the upper sub-assembly of the micro key). It can be as simple as an on/off switch (electric contact) and in that case the precision of the monitor would be coarse-grain, or as complex as a magnetic field resistor, and in that case the level of electric current in that monitor will facilitate a finer grained resolution of the micro key vertical position.

As shown in FIGS. 2 and 3, the dynamic display panel at the top of each micro key 106 is adjustable between black and white; Alternatively: (i) the display may be able to show colors; and/or (iii) there may be more than one pixel per dynamic display panel. As further shown in FIG. 2, the macro keys are coordinated in their displays in order to render an "A," and a "B," which displays, of course, correspond to the meaning of the macro key in this embodiment. The dynamic display may use various technologies (now known or to be developed in the future) such as electrophoretic ink or organic light-emitting diodes. As best shown in FIG. 3, the display is controlled by software 146 through communication lines 102.

Figure 5A:
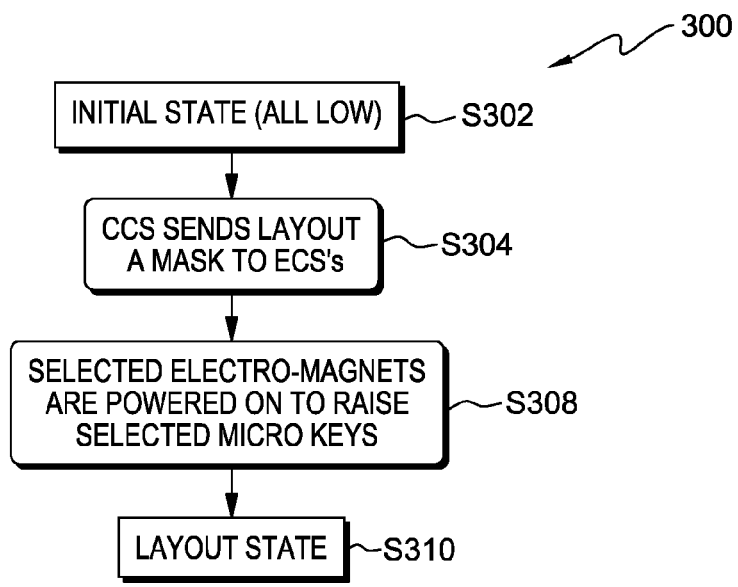
FIG. 5A is a process according to the present invention that occurs when the system morphs into a predetermined macro key layout.

As shown in FIG. 5A, flowchart 300 shows a process by which keyboard 100 morphs from its initial flat state into a predetermined keyboard layout called "layout A." At step S302, the keyboard is receiving no power and all of the micro keys of keyboard 100 are therefore in their low position, as discussed above. At step S304, the computer control system sends power on signals to elevation control systems of selected micro keys of keyboard 100 according to a "mask" for layout A.

At step S308, and in selective response to the mask signals sent at S304, the micro keys that are going to be put in the high at-rest state, in order to form constituent parts of the macro keys, have their electromagnets turned on in order to push their respective key tops upwards under influence of the magnetic fields of their respective electromagnets. On the other hand, keys that are not going to be part of macro key of layout A are left powered down so that they remain in their low at-rest positions. At step S310, the micro keys are fully actuated and the keyboard has morphed into layout A, ready for a user's key presses.

Figure 5B:
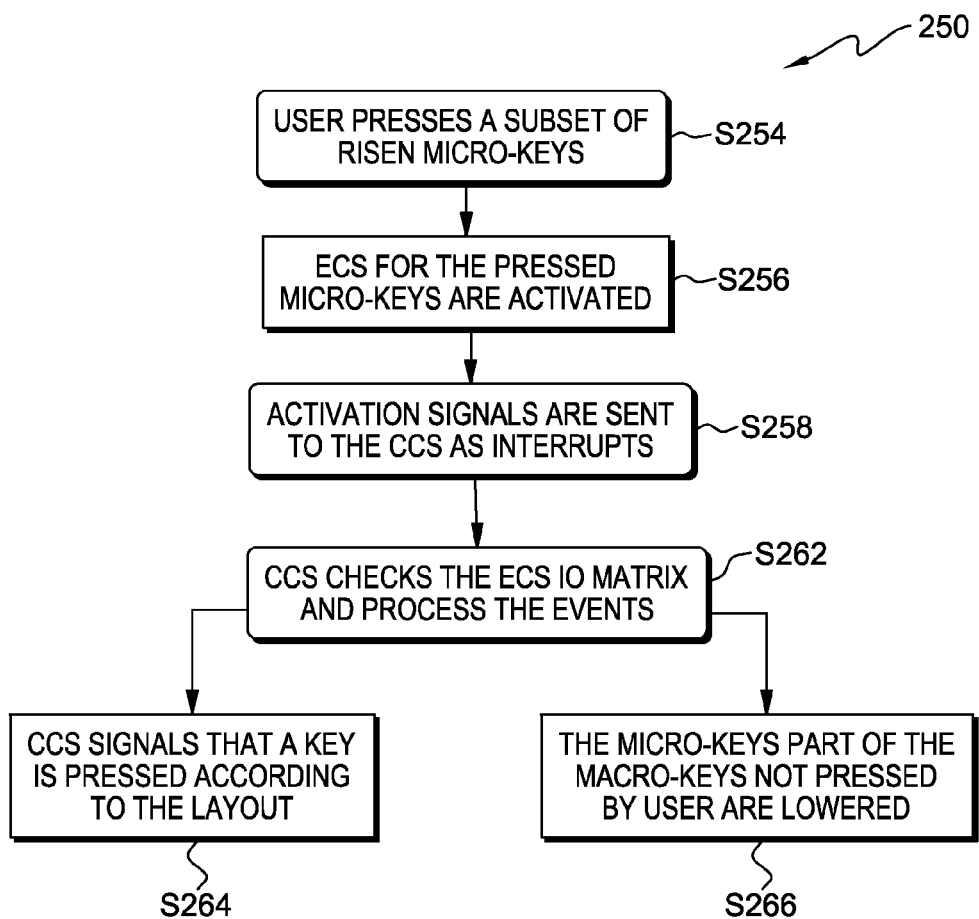
FIG. 5B is a process according to the present invention that occurs when a user presses a macro key.

FIG. 5B shows flowchart 250, which is a process that occurs when a user presses a macro key according to the present invention. At step S254, the user presses a desired macro key. However, the user's rounded and somewhat elastic fingertip will not generally contact every micro key in the macro key formation. Rather, the user will generally be depressing a subset of the subset of micro keys that make up the desired macro key. At step S256, there is electromagnetic interaction between the magnetic coating 152 in the tops of the micro keys being pressed downward and the elevation monitors 170 at the respective bases of the micro keys. This will cause, at step S258, electronic activation signals to be sent from the elevation control systems of the depressed micro keys to computer control system 140. These activation signals are received by the computer control system as interrupts.

At step S262, in response to the interrupt signals received at step S258, the computer control system checks the entire matrix of elevation control systems to: (i) determine which micro keys are being depressed; and (ii) based on the amount and pattern of micro keys being depressed, determines which macro keys the user is intending to depress. At step S264, the computer control system sends out a signal corresponding to the signal that a traditional electronic keyboard sends out when key(s) are pressed. At step S266, the computer control system sends out appropriate signals so that, for the macro key(s) being pressed by the user, the micro keys that the user is not directly depressing will be released by their respective electromagnets down to their low position, so that the user gets the impression that the entire macro key (both directly depressed and not-directly-depressed portions) is descending in the manner of a single unitary key.

Figure 5C:
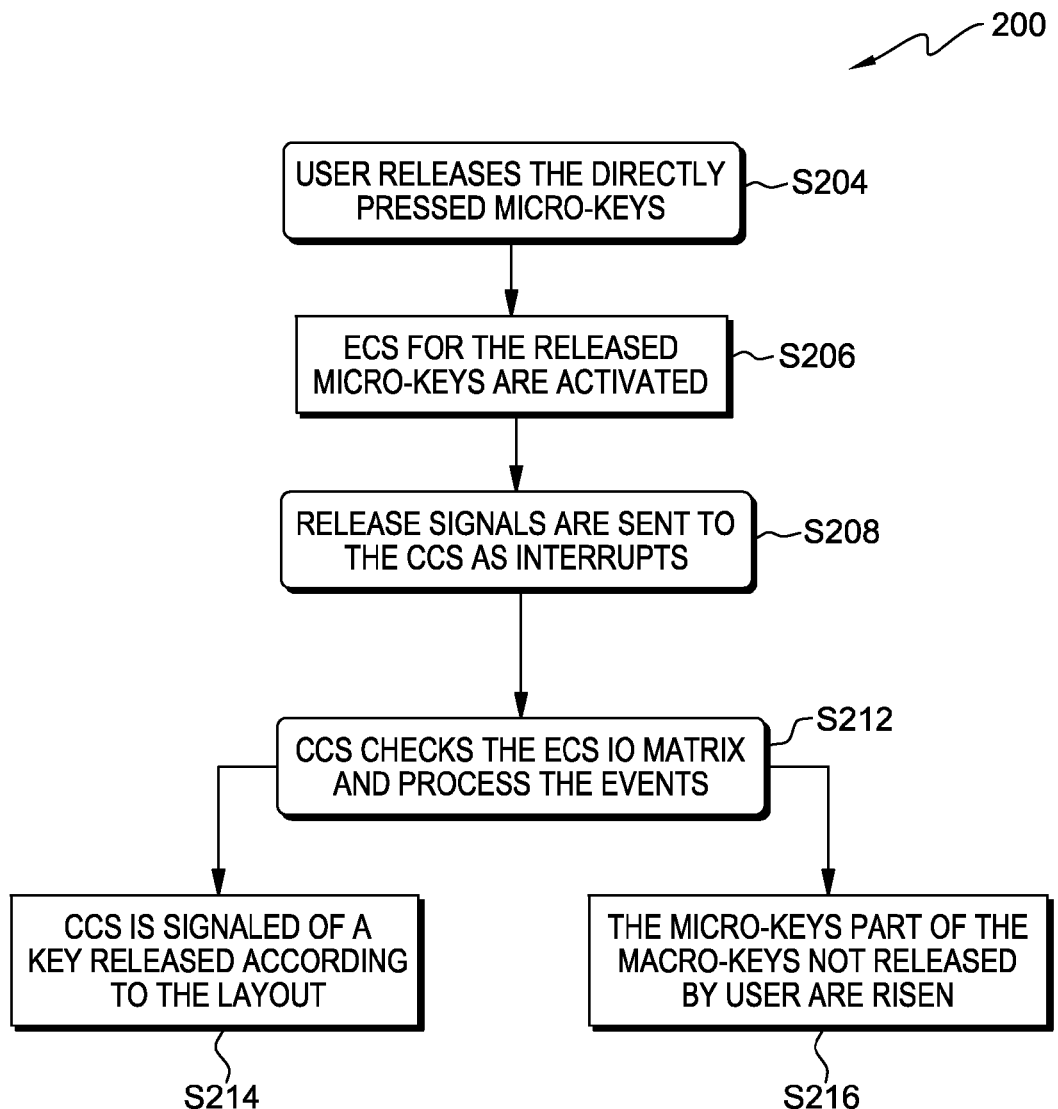
FIG. 5C is a process according to the present invention that occurs when a user releases a macro key.

FIG. 5C shows flowchart 200, which is a process that occurs when a user releases a macro key according to the present invention. At step S204, the user releases the macro key (previously pressed in process 250 as discussed above). More specifically, the user releases the subset of micro keys upon which the user was exerting downwards pressure with her fingertip. This causes, at step S206, the elevation control systems of the released micro keys to send out electronic release signals as the magnetic coatings 152 in the micro key tops move away from the elevation monitors in the respective bases of the manually released micro keys. At step S208, these release signals are received, as interrupts, by the computer control system. At step S212, in response to the interrupts received at step S208, the computer control system checks the elevation control systems of all the micro keys and determines which macro keys the user is intending to release.

At step S214, the computer control system sends out a signal, similar to a corresponding signal from a traditional electronic keyboard, that the macro key(s) have been released.

At step S216, the micro keys that were previously released to their low at-rest positions at step S266 again raised by their respective electromagnets under control of signals from the computer control system. This gives the user the impression that the entire macro key is raising in unison, in the manner of a traditional unitary keyboard key.

In the methods of FIGS. 5A to 5C, computer control system 140 (see FIG. 3) provides all control signals for all operations of the keyboard. Alternatively, this control system may be broken into two parts: (i) a keyboard control system built into the casing of the keyboard; and (ii) a software-based external computer control system programmed into a computer to which the keyboard is attached as a peripheral device. In some embodiments, the elevation assembly is capable of multiple elevation states, from as low as 2 states (up/down) to multiple levels of elevation. In the simplest implementation, a switch should indeed be enough. A more complex implementation would need some elevation regulation logic to generate a more sophisticated positional output signal corresponding to vertical position of the micro key.

Figure 6:
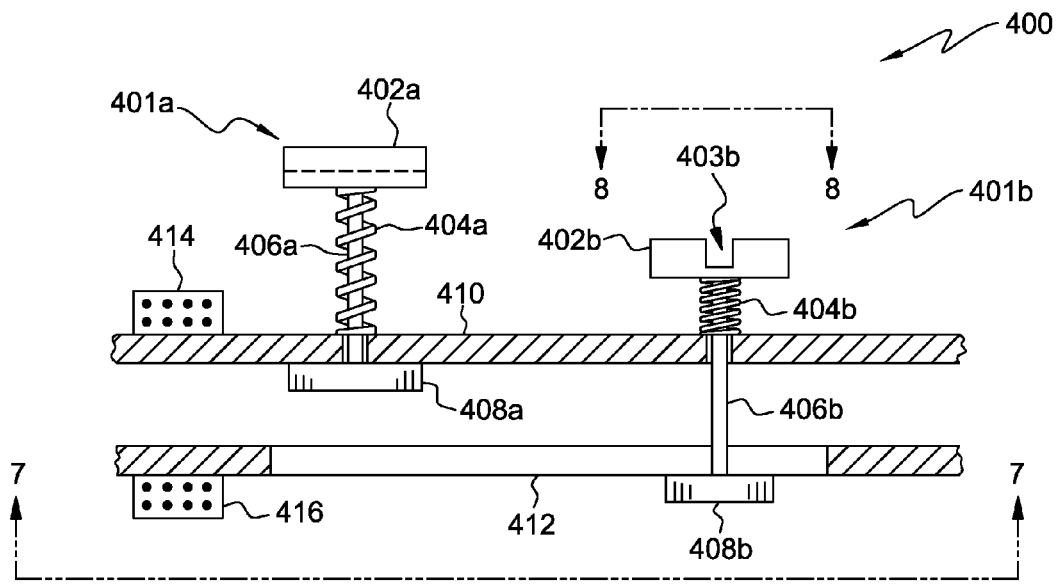
FIG. 6 is a cross sectional view of a portion of a second embodiment of an adjustable keyboard according to the present invention.
Figure 7:
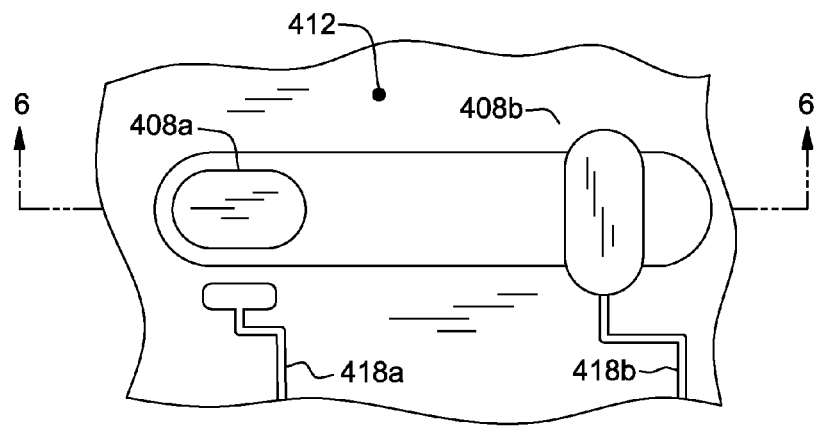
FIG. 7 is an internal view of a portion of the second embodiment keyboard.
Figure 8:
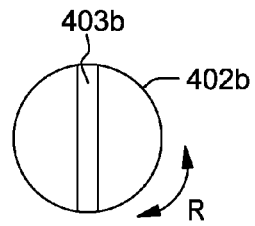
FIG. 8 is an orthographic top view of a key of the second embodiment keyboard.

FIGS. 6 to 8 show an adjustable keyboard assembly 400, including: micro key sub-assemblies 401; upper printed circuit board 410; lower printed circuit board 412; upper connector; and lower connector 416. Each micro key 401 includes user interface member 402; slot 403; coil spring 404; stem 406; and base 408. Lower printed circuit board 412 includes pad/lead formations 418.

In embodiment 400, the adjustment between the high position (see micro key 401a) and low position (see micro key 401b): (i) is my mechanical, rather than electromagnetic, forces; (ii) can be performed by a human user (at least if the micro key top surface is large enough); and (iii) is accomplished by turning-while-raising-or-lowering the desired micro key sub-assemblies 401. More specifically, a very small screwdriver may be inserted into slot 403, by a human or machine, and turned in direction R (see FIG. 7) by 90 degrees either: (i) before either allowing the micro key assembly to rise under the upwards biasing influence of coil spring 404 (to move the micro key to the high position: or (ii) after pushing the micro key down until base 408 has cleared second printed circuit board 412 in the downwards direction (to move the micro key to the low position).

The following paragraphs set forth some definitions applicable to this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

In practical embodiments, two adjacent micro keys would not generally be spaced as far apart as they are shown in FIGS. 6 and 7. However, in this embodiment, adjacent micro keys must be spaced far apart enough within the larger matrix so that rotation in the R direction can be accomplished without physical interference between adjacent micro keys.

In embodiment 400, the micro keys do not have displays on the tops of their respective user interface members. Alternatively: (i) the micro keys could be provided with respective dynamic displays (as in embodiment 100); or (ii) the micro keys could be provided with static displays, such as stickers, paint, small black-or-white cover panel, etc.

In embodiment 400, the high and low at-rest positions, measured along a vertical axis will be the same for all of the micro keys. Alternatively, in other embodiments, the micro keys may have respectively different low positions and high positions. In embodiments where different micro keys respectively have different at-rest high and low position, and the micro keys are expected to morph into macro keys, then the high and low positions of each micro key should be designed so that it is still possible to make meaningful macro keys. For example, in some embodiments, the 10 rows of micro keys toward the rear of the keyboard may have higher at-rest positions than the next 10 rows closer to the front, which may, in turn have higher at-rest positions than the next 10 rows closer to the front, and so on. In this way, the keyboard would have a sort of incline where macro keys made at the front of the keyboard are lower than macro keys made at the rear.

Unlike embodiment 100, embodiment 400 does not allow for the software control of at-rest micro key positions. For applications where the key layout is to be frequently shifted, it is generally helpful to have the software control of a computer control system. Software control is generally much easier and quicker for a keyboard user than the manual control of embodiment 400. On the other hand, there may be other applications where the manual micro key position control of embodiment 400 is acceptable.

Some embodiments of the present invention may include one, or more, of the following features, characteristics and/or advantages: (i) a single device capable of providing users with multiple key layouts; (ii) a software-based elevation and co-ordination system to control the position and/or operation of each micro-key; (iii) an elevation and control system for determining the at-rest position of each micro key is controlled by software (for example, software in an external computer control system); (iv) each micro key sends a signal back to the computer control system upon actuation of that micro key so that there is effectively two way communication between the computer control system and each micro key; (v) the signals of micro keys can be combined to express a meaning; (vi) the meaning of the combined signal of a predetermined combination of micro keys is controlled by the computer control system depending on a user-defined layout; (vii) the computer control system provides feedback to one or more micro keys on their independent elevation depending on the layout; (viii) the keyboard layout can be changed by the user or by an application (for example, switching between a word processing application and a graphics program automatically incur a keyboard layout change).

As a further possibility, the at-rest positions of the micro keys could make a layout that does not mimic a traditional keyboard layout and that does not even have macro keys at all. For example, the elevated micro keys could take on the geographic shape of a state, or nation, such that the layout becomes a sort of map where a user can select a location on the map. When the user has finished selecting the location by pressing on the elevated micro keys corresponding to the desired location on the map, then the micro keys can be repositioned once more into the form of a traditional keyboard. As a further example, the keyboard layout could be made to display (at least a portion of) a PCB (printed circuit board) for hardware circuitry design. Again, the user would press on the micro keys in the PCB representation corresponding to a location to be edited as part of the PCB design process.

To expand on the previous paragraph, the pattern of high and low at-rest keys may cause a representational image to be formed on the keyboard, with the representational image corresponding to at least one of the following: a map, a picture, a maze, a guide for motion, a circuit, a chemical formula and a mathematical equation. In these embodiments, it may be preferred to have more than two possible and controllable at-rest positions of the keys so that images formed on the keyboard may be more representational and granular with respect to the vertical direction.

Some further comments will now be made regarding the various ways that the depression of a micro key, and/or the lowering of a micro key into the low at-rest position, will now be discussed. In some embodiments, each micro key member has an associated output generator that is structured to output a signal (as discussed above) based upon whether its associated micro key member is being depressed by a user. In some embodiments, the signal generated by the output generator is caused by at least one of the following mechanisms: (i) an electrical switch opens and closes based upon position of the micro key member, (ii) an optical switch opens and closes based upon position of the micro key member, and (iii) a magnetic field is changed based upon position of the micro key member.

The following paragraphs provide some definitions for certain words or terms used in this document.

and/or: non-exclusive or; for example, A and/or B means that: (i) A is true and B is false; or (ii) A is false and B is true; or (iii) A and B are both true.

Electrically Connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Matrix: any set of relatively proximate micro keys that may be configured as a keyboard having macro key formations, regardless of whether: (i) the micro keys form a substantially planar surface; (ii) adjacent micro keys touch each other; (iii) shape of the user interface member at the top of the keys; (iv) the number of micro keys needed to make a meaningful macro key formation; (v) the matrix layout follows a regular co-ordinate system (for example, cylindrical, Cartesian); (vi) all the micro keys are identical in size and/or shape; and/or (vii) the number of macro key formations that can be made.

Discrete keys: each key is a separate piece; for example, a membrane keyboard does not generally have discrete keys because all keys are (at least in part) portions of a continuous membrane.

What is claimed is:

1. A keyboard assembly comprising:
 a keyboard frame;
 a plurality of microkey assemblies, with each microkey assembly comprising:
  a lower frame defining a peripheral direction and an interior space and including a flange extending outwardly in the peripheral direction,
  an upper frame including a flange extending inwardly in the peripheral direction,
  an electromagnet located in the interior space of the lower frame, with the electromagnet defining an interior space,
  an elevation monitor sub-system sized and located to extend through at least a portion of the interior space of the electromagnet, and
  a magnetic coating layer; and
 a plurality of elevation control signal carriers respectively operatively connected to the electromagnets of the plurality of microkey assemblies;
 wherein:
 the plurality of microkey assemblies are each mechanically connected to the keyboard frame in a common orientation that defines an up direction and a down direction that is at least substantially orthogonal to the up and down directions;
 for each microkey assembly, the magnetic coating layer, the electromagnet and the respectively corresponding elevation control signal carrier is structured, located and connected to selectively produce magnetic fields that interact with the magnetic coating layer so that: (i) an at-rest position of the key sub-assembly can be adjusted between at least a high at-rest position and a low at-rest position, (ii) the upper frame and magnetic coating layer are free to move in the down direction at least when the microkey assembly is in the high at-rest position, and (iii) the supper frame and magnetic coating layer are mechanically biased in the up direction, by magnetic interaction between the electromagnet and the magnetic coating layer when the microkey is in the high at-rest position;
 for each microkey assembly, the elevation monitor sub-system includes a switch that is structured, located and connected to output a signal based upon whether its associated key member is being depressed by a user; and
 in each microkey assembly, the flange of the upper frame and the lower frame are sized, located and oriented to come into interfering contact when the upper frame rises with respect to the lower frame so that the upper frame is limited in its up direction travel.

2. The keyboard assembly according to claim 1 wherein:
 for each microkey assembly, the electromagnet and magnetic coating layer are structured and located so that when the electromagnet is energized by receiving power through the respectively corresponding elevation control signal carrier, the microkey assembly will be driven to occupy a high at-rest position and will be mechanically biased in the up direction; and
 for each microkey assembly, the upper frame and lower frame are structured, mechanically engaged and located so that when the electromagnet is not energized, the microkey assembly will be driven by gravity to occupy a low at-rest position.

3. The keyboard assembly of claim 1 wherein each microkey assembly further comprises:
 a dynamic display panel located over a top surface of the microkey assembly, with the dynamic display panel being structured to provide a display of at least one pixel in size.

4. The keyboard assembly of claim 1 wherein:
 for each microkey assembly, the electromagnet and magnetic coating layer are structured and located so that when the electromagnet is energized in a first direction by receiving power through the respectively corresponding elevation control signal carrier, the microkey assembly will be driven to occupy a high at-rest position and will be mechanically biased in the up direction; and
 for each microkey assembly, the electromagnet and magnetic coating layer are structured and located so that when the electromagnet is energized in a second direction by receiving power through the respectively corresponding elevation control signal carrier, the microkey assembly will be driven to occupy a low at-rest position.

5. The keyboard assembly of claim 1 wherein:
 for each microkey assembly, the electromagnet and magnetic coating layer are structured and/or located so that when the electromagnet is energized by receiving power through the respectively corresponding elevation control signal carrier, the microkey assembly can selectively be driven to occupy at least one intermediate at-rest position(s), which is between the high at-rest position and the low at-rest position.

6. The keyboard assembly of claim 1 wherein the switch is one of the following switch types: an optical switch, or an magnetic switch.

7. A keyboard assembly comprising:
 a keyboard frame;
 a plurality of microkey assemblies, with each microkey assembly comprising:
  a lower frame defining a peripheral direction and an interior space and including a flange extending outwardly in the peripheral direction,
  an upper frame including a flange extending inwardly in the peripheral direction,
  an electromagnet located in the interior space of the lower frame, with the electromagnet defining an interior space, an elevation monitor sub-system sized and located to extend through at least a portion of the interior space of the electromagnet, and a magnetic coating layer; and a plurality of elevation control signal carriers respectively operatively connected to the electromagnets of the plurality of microkey assemblies;

wherein:

the plurality of microkey assemblies are each mechanically connected to the keyboard frame in a common orientation that defines an up direction and a down direction that is at least substantially orthogonal to the up and down directions;

for each microkey assembly, the magnetic coating layer, the electromagnet and the respectively corresponding elevation control signal carrier is structured, located and connected to selectively produce magnetic fields that interact with the magnetic coating layer so that: (i) an at-rest position of the key sub-assembly can be adjusted between at least a high at-rest position and a low at-rest position, (ii) the upper frame and magnetic coating layer are free to move in the down direction at least when the microkey assembly is in the high at-rest position, and (iii) the upper frame and magnetic coating layer are mechanically biased in the up direction, by magnetic interaction between the electromagnet and the magnetic coating layer when the microkey is in the high at-rest position;

for each microkey assembly, the elevation monitor sub-system is structured, located and connected to output a signal based upon whether its associated key member is being depressed by a user, with the signal being caused by changes in a magnetic field caused by position of the magnetic coating layer; and in each microkey assembly, the flange of the upper frame and the lower frame are sized, located and oriented to come into interfering contact when the upper frame rises with respect to the lower frame so that the upper frame is limited in its up direction travel.

8. The keyboard assembly according to claim 7 wherein:

for each microkey assembly, the electromagnet and magnetic coating layer are structured and located so that when the electromagnet is energized by receiving power through the respectively corresponding elevation control signal carrier, the microkey assembly will be driven to occupy a high at-rest position and will be mechanically biased in the up direction; and for each microkey assembly, the upper frame and lower frame are structured, mechanically engaged and located so that when the electromagnet is not energized, the microkey assembly will be driven by gravity to occupy a low at-rest position.

9. The keyboard assembly of claim 7 wherein each microkey assembly further comprises:

a dynamic display panel located over a top surface of the microkey assembly, with the dynamic display panel being structured to provide a display of at least one pixel in size.

10. The keyboard assembly of claim 7 wherein:

for each microkey assembly, the electromagnet and magnetic coating layer are structured and located so that when the electromagnet is energized in a first direction by receiving power through the respectively corresponding elevation control signal carrier, the microkey assembly will be driven to occupy a high at-rest position and will be mechanically biased in the up direction; and for each microkey assembly, the electromagnet and magnetic coating layer are structured and located so that when the electromagnet is energized in a second direction by receiving power through the respectively corresponding elevation control signal carrier, the microkey assembly will be driven to occupy a low at-rest position.

11. The keyboard assembly of claim 7 wherein:

for each microkey assembly, the electromagnet and magnetic coating layer are structured and located so that when the electromagnet is energized by receiving power through the respectively corresponding elevation control signal carrier, the microkey assembly can selectively be driven to occupy at least one intermediate at-rest position(s), which is between the high at-rest position and the low at-rest position.

* * * * *